United States Patent [19]

Heath

[11] Patent Number: 4,940,016

[45] Date of Patent: Jul. 10, 1990

[54] UNITARY COLLAPSIBLE AND DISPOSABLE PET LITTER CONTAINER

[76] Inventor: Edward A. Heath, 465 Arapahoe, Boulder, Colo. 80302

[21] Appl. No.: 170,282

[22] Filed: Mar. 18, 1988

[51] Int. Cl.⁵ .............................................. A01K 1/035
[52] U.S. Cl. ....................................... 119/1; 229/132; 229/183
[58] Field of Search .................. 119/1, 19; 229/132, 229/183

[56] References Cited

U.S. PATENT DOCUMENTS

| | | | |
|---|---|---|---|
| 2,209,593 | 7/1940 | Bernis | 229/183 |
| 2,276,820 | 3/1942 | Bonfield | 229/183 |
| 3,048,147 | 8/1962 | McKean | 119/1 |
| 3,201,026 | 8/1965 | Travis et al. | 229/132 |
| 4,164,314 | 8/1979 | Edgar | 119/1 |
| 4,305,544 | 12/1981 | Noonan | 119/1 |
| 4,348,982 | 9/1982 | Selby | 119/1 |
| 4,391,223 | 7/1983 | Holland et al. | 119/19 |
| 4,441,451 | 4/1984 | Neal | 119/1 |
| 4,553,671 | 11/1985 | Cheesman | 119/1 |
| 4,782,788 | 11/1988 | Arcand | 119/1 |
| 4,792,082 | 12/1988 | Williamson | 119/1 |
| 4,803,952 | 2/1989 | Houser | 119/19 |

Primary Examiner—Robert Peshock
Assistant Examiner—Michael Lynch
Attorney, Agent, or Firm—John L. Isaac

[57] ABSTRACT

A disposable pet litter container is disclosed. The container is foldable between a collapsed state for storage and disposal, and an erect state for use. The container includes a lower box portion defining a litter-containing receptacle. The lower box portion includes a bottom, peripheral wall members extending upwardly from the bottom to form the litter-containing receptacle therewith, and a foldable top for covering the lower box portion in the collapsed state. An upper box portion is provided and is selectively extendable from the lower box portion. The upper box portion includes front and rear panels extending upwardly from one pair of oppositely disposed wall members of the lower box portion and are adapted for selectively folding into the lower box portion for storage when in its collapsed state. A pair of side panels are also provided and project upwardly from a second pair of oppositely disposed peripheral wall members and are adapted to form the top when in its collapsed state. The side panels include a mechanism for interlocking with the front and rear panels to selectively maintain the container in its erect state and further includes top flap members adapted for overlapping engagement when in its erect state to form a top surface for the container and to totally enclose the container. Finally, the front panel has an entry to and from the interior of the enclosed, erect container.

21 Claims, 3 Drawing Sheets

UNITARY COLLAPSIBLE AND DISPOSABLE PET LITTER CONTAINER

BACKGROUND OF THE INVENTION

1. FIELD OF THE INVENTION

This invention relates generally to pet litter containers and, more particularly, to disposable pet litter containers constructed from cardboard and the like. Specifically, the present invention relates to such a collapsible pet litter container constructed from a single piece of material and which is adapted to be fully enclosed during use.

2. DESCRIPTION OF THE PRIOR ART

Disposal systems for pets, and in particular cats, are well known to the art. The traditional cat litter box has generally consisted of an open container of some sort with particulate litter material, comprised of clay and other absorbent materials, placed therein. The litter material absorbs urine and odors, and as the box becomes filled, the soiled litter is removed and replaced.

One of the more annoying problems with existing pet litter boxes of the type described above, is that the pets tend to dig in the clay and spread it during use. This frequently causes the clay and fecal matter to be kicked out of the box onto the floor area surrounding the box. This situation is both messy and a potential health problem due to diseases associated with cat litter. Moreover, the open box itself can also be a source of certain problems due to diseases associated with cat litter. One answer to this particular problem was the advent of litter containers that were enclosed. Examples of such enclosed containers include U.S. Pat. Nos. 4,111,157, 4,522,150 and 4,667,622. While the animal litter containers disclosed in these references address the problem of retaining the litter and fecal matter within the container, these particular arrangements are expensive and still require certain disassembly in order to clean the litter box and change the litter.

Another problem associated with cat litter boxes includes the distasteful and unsanitary job of either cleaning the litter in the box and/or changing the litter. The process of dumping the litter from a box can cause certain health problems since considerable particulate matter becomes airborne as the solid litter is dumped, thereby increasing the potential of transmitting litter box diseases to the individuals dumping the litter. Moreover, the odor and general uncleanliness of the situation is highly distasteful to many people. Solution to this situation were sought in part by the design of disposable litter boxes. There are numerous examples of such disposable litter containers in the art, and they include devices disclosed in the following listed U.S. Pat. Nos.: 3,154,052, 4,441,451, 3,377,990, 4,501,226, 3,684,155, 4,541,360, 3,743,170, 4,548,160, 4,014,292, 4,627,382, 4,164,314, 4,628,863, 4,271,787, 4,646,685, 4,305,544, 4,648,349.

While all of the above referenced patents disclose disposable litter boxes for cats, all of them are open containers readily accessible to the environment and therefore have the same problems as initially described above. Moreover, a measure of these devices are complicated containers to both manufacture and assemble. Some of the devices include their own tops for storage, while others require additional packaging material for storage. Moreover, it is also necessary to separately add litter to these disposable boxes, and the process of adding litter to a cat litter box in and of itself can be distasteful because of the large amount of fine particulate material which is put into the air at the time clay litter is transferred to the litter box.

U.S. Pat. No. 4,348,982 attempts to attend to both of the above problems by disclosing an enclosed, disposable cat relief chamber. Howver, this particular device is relatively complicated and expensive to manufacture and does not come with its own litter contained therein. Moreover, the device of this particular reference also has a storage and disposal problem in that it is not collapsible during storage or disposal. Thus, there is still the potential for easy spillage of cat litter during disposal as well as space problems of disposal due to the size of the enclosed, non-collapsible litter box. Therefore, there is still a distinct need for an enclosed, disposable pet litter container which entails little or no mess in either the placement or removal of litter therefrom.

SUMMARY OF THE INVENTION

Accordingly, it is one object of the present invention to provide an improved disposable pet litter container.

Another object of the present invention is to provide a disposable pet litter container which is totally enclosed to prevent spillage of litter during use by pets.

Yet another object of the present invention is to provide a disposable, totally enclosed pet litter container which is capable of being manufactured from a single blank of material.

A further object of the present invention is to provide a disposable totally enclosed pet litter container which is easily stored in a collapsible state, readily erected for use, and easily stored in a collapsible state, readily erected for use, and easily returned to its collapsible state for disposal purposes.

Still another object of the present invention is to provide a disposable, totally enclosed pet litter container which contains its own litter and does not require removal thereof for disposal.

To achieve the foregoing and other objects and in accordance with the purpose of the present invention, as embodied and broadly described herein, a disposable pet litter container is disclosed. The container is foldable between a collapsed state for storage and disposal and an erect state for use. The container includes a lower box portion defining a litter-containing receptacle. The lower box portion includes a bottom, peripheral wall members extending upwardly from the bottom to form the litter-containing receptacle therewith, and a foldable top for covering the lower box portion in its collapsed state. An upper box portion is selectively extendable from the lower box portion. The upper box portion includes front and rear panels extending upwardly from one pair of oppositely disposed peripheral wall members of the lower box portion and are adapted for selective folding into the lower box portion for storage when in its collapsed state. A pair of side panels also project upwardly from a second pair of oppositely disposed peripheral wall members and are adapted to form the foldable top when in its collapsed state. The side panels include a mechanism for interlocking with the front and rear panels to selectively maintain the container in its erect state. The side panels further include top flap members adapted for overlapping engagement when in its erect state to form a top surface for the container and to totally enclose the container. Finally, the front panel has a pet entry into and from the interior of the enclosed, erect container.

BRIEF DESCRIPTION OF THE DRAWINGS

The accompanying drawings which are incorporated in and form a part of the specification illustrate preferred embodiments of the present invention, and together with a description, serve to explain the principles of the invention. In the drawings.

DETAILED DESCRIPTION OF THE PREFERRED EMBODIMENTS

Figure 1:
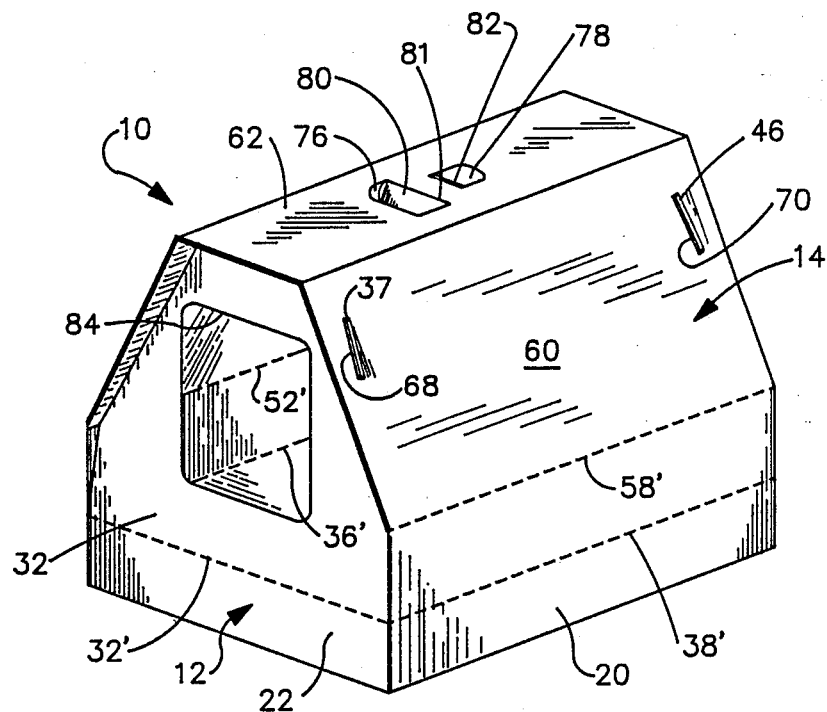
FIG. 1 is a front perspective view of the litter box of the present invention in its erect state.

Referring to FIGS. 1-4, a pet litter container 10 preferably includes a lower box portion 12 and an upper box portion 14. The lower box portion 12 is constructed from a bottom 16, a pair of peripheral side walls 18, 20, and a pair of peripheral end walls 22, 24. The peripheral wall members 18-24 extend substantially vertically upwardly from the bottom 16 and define a receptacle or bin 26 adapted to contain particulate litter material 28 and the like. As can be appreciated from the description provided below, it is preferred that the litter material 28 be placed within the receptacle 26 at the time of formation of the container 10 and remain therewithin throughout the life of the container 10. The litter material 28 can be of any desired material known to the art, such as clay. Moreover, it is preferred that the interior surface of the receptacle 26 be lined, sealed or in some way treated to reduce the likelyhood of liquid soakage therethrough. Examples of such lining includes a plastic liner secured to the surface, wax treatments of the surface, and the like.

Figure 2:
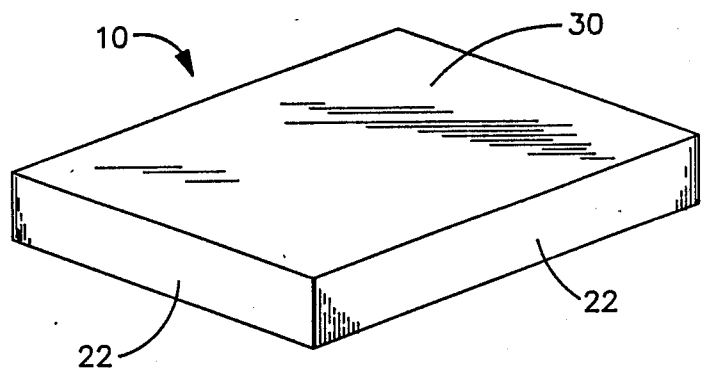
FIG. 2 is a front perspective view of the litter box of the present invention in its fully collapsed state for both storage and disposal.

In preferred form, the lower box portion 12 is preferably approximately 14 inches wide by 18 inches long and approximately two and one-half inches in height, that is the peripheral walls 18-24. When the container 10 is in its collapsed state as illustrated in FIG. 2, a top member 30 is provided which encloses the container 10 and provides a compact and easily stored article. As previously indicated, it is preferred that the litter 28 be stored within the box 10, and it is further preferred that the box 10 in its collapsed, stored condition, as illustrated in FIG. 2, be sealed with a plastic wrap or simialr type of material to maintain the litter in a dried condition for an indefinite storage period of time.

The container 10, when in its erected state, includes a front panel 32, a rear panel 34, a pair of side panels 36, 38. The front and rear panels 32, 34 are extensions, respectively, of the end peripheral walls 22, 24 and are defined by a fold crease 32', 34', respectively. Each of the panels 32, 34 has a lower portion which extends approximately one-third the height thereof, or preferably about three inches, vertically upwardly. The remaining upper two-thirds of the panels 32, 34 are generally in the form of a modified "A", or that of a truncated cone shape. The front panel 32 includes a pair of ears 35, 37 projecting outwardly from the side edges 40, 42, respectively thereof. Likewise, the rear panel 34 includes a pair of ears 44, 46 projecting, respectively, from the side edges 48, 50 thereof. The function of the ears 35, 37, 44, 46 will be described in more detail below. When it is desired to collapse the container 10 to its storage and disposal condition as illustrated in FIG. 2, the side panels 32, 34 are folded inwardly along the fold creases 32', 34' into the receptacle 26. The height of the front and rear panels 32, 34 are such so that the panels 32, 34 are contained fully within the receptacle 26.

The side panels 36, 38 are similarly extensions of the peripheral side walls 18, 20 and are interconnected thereto along fold creases 36', 38'. The side panel 36 is divided into two side portions 52, 54 by a fold crease 52' which is substantially parallel to the fold crease 36'. The side panel portion 52 is approximately one-third the heights of the panel 36 and is preferably equivalent in height to the lower portion of the end panels 32, 34. A top flap 56 is disposed at the end of the side portion 36 and is defined by a fold crease 54' which is likewise parallel to the creases 36', 52'.

The opposite side panel 38 is likewise divided into a lower portion 58 and an upper portion 60 by a fold crease 58'. In addition, a top flap 62 is provided at the end of the side panel 38 and is defined by a fold crease 60'. The side panel 36 includes a pair of slots 64, 66, while the side panel 38 alsp includes a pair of slots 68, 70. These slots are adapted for engagement with corresponding ears 35, 37, 44, 46, respectively, of the front and rear panels 32, 34. This interengagement can be clearly seen in FIG. 1 wherein the ear 37 is illustrated as having engaged through the slot 68, while the ear 46 is illustrated as passing through the slot 70. This interengagement of the slots with the ears is what maintains the container 10 in its erect psotion as illustrated in FIG. 1.

When the ears 35, 37, 44, 46 have been interengaged with the slots 64-70, the top flaps 56 and 62 are preferably overlapped with each other. The top flap 56 includes apertures 72, 74, while the top flap 62 includes apertures 76, 78. The apertures 76, 78 are preferably formed by cutting tabs in the flap 62, although the tabs are not fully removed but are retained along one side thereof. FIG. 1 illustrates clearly the tab 80 which is cut into the top 62 to form the aperture 76 but which is retained along its edge 81. In this manner, the tab 80 can be bent through the aperture 76 and the corresponding aperture 72 and around to the underside of the inner top flap 56 so as to firmly interengage the top flap 62 with the flap 56 and thus interlock these members. The interlocking of the top flap 62 and 56 further insures the maintenance of the container 10 in its erect position. Moreover, these apertures may also serve as a handle or handle hold for carrying the container 10 in its erect position, although any type of handle arrangement may be utilized with the present invention.

As can be seen from FIG. 1, in particular, the fold or crease lines 52', 58' in the side portions 36, 38 are provided to permit the upper sections 54, 60 of the sides 36, 38 to be angled inwardly along the edges 40, 42, and 48, 50 of the end panels 32, 34, respectively. This preferred shape of the container 10 reduces the amount of material necessary to construct the container yet provides ample head room and maneuvering room for the pet within the container 10. Moreover, this angle orientation also assists in maintaining the container 10 in its erect position.

A front entryway 84 is provided in the front panel 32 to permit access to the interior of the container 10 when the container 10 is in its erect position. The positioning of the opening 84 is important in that it should be as high as possible along the panel 32 relative to the bottom 16 to prevent a pet from kicking litter out of the container 10 through the opening 84 when the container 10 is in use. If the opening 84 is positioned low on the panel 32, there is an increased likelyhood that litter and fecal matter may be kicked through the opening 84 and onto the surface area surrounding the container 10, thereby defeating one of the prime purposes of the present invention which is to provide a total enclosure device for cleanliness and sanitation. It also preferred that a ventilation opening, such as the half moon 86 in the rear panel 34, is provided to assist in ventilation of the interior of the container 10.

Figure 3:
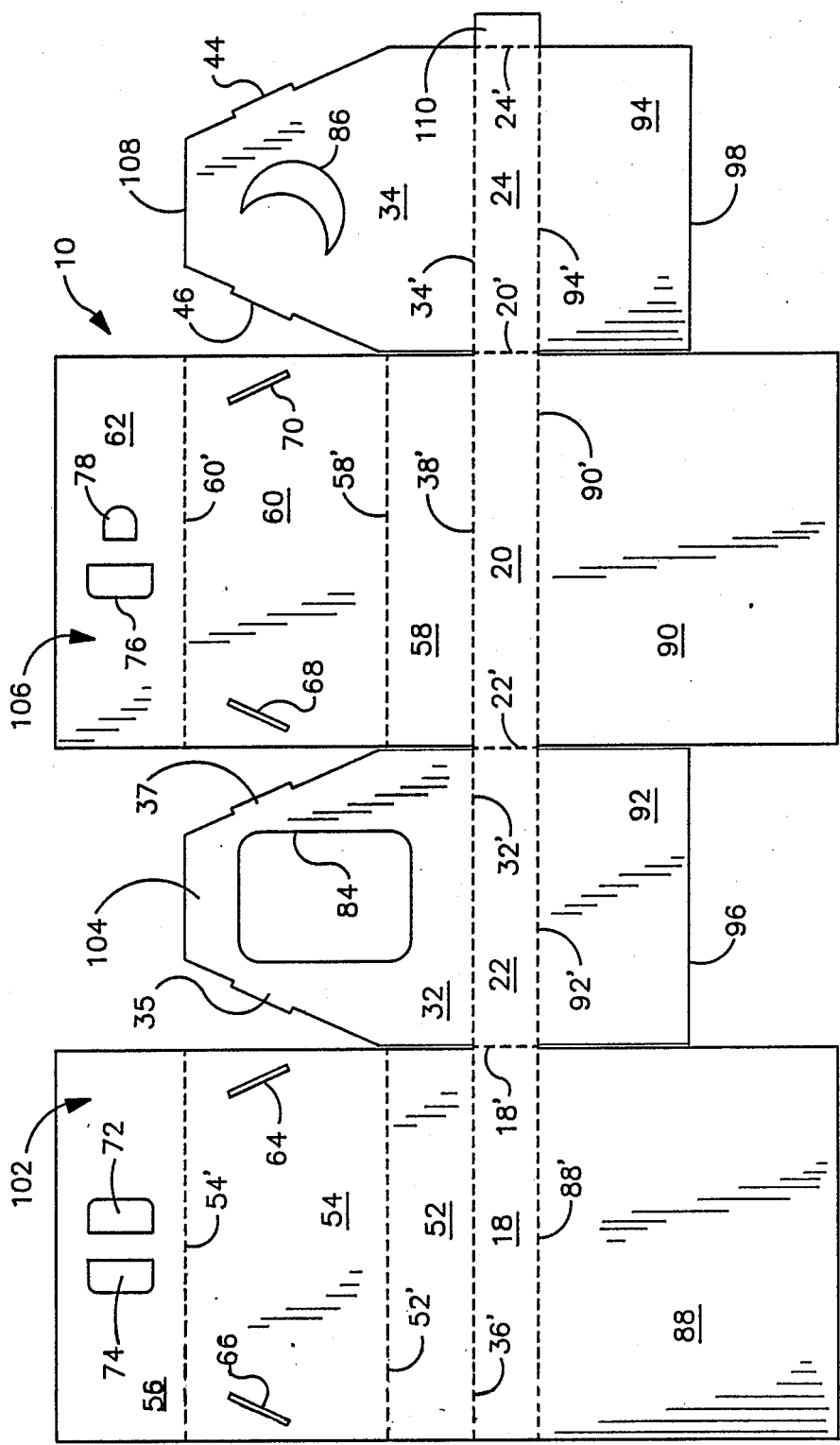
FIG. 3 is a plan view of a unitary blank of container material cut for forming the litter box of the present invention.
Figure 4:
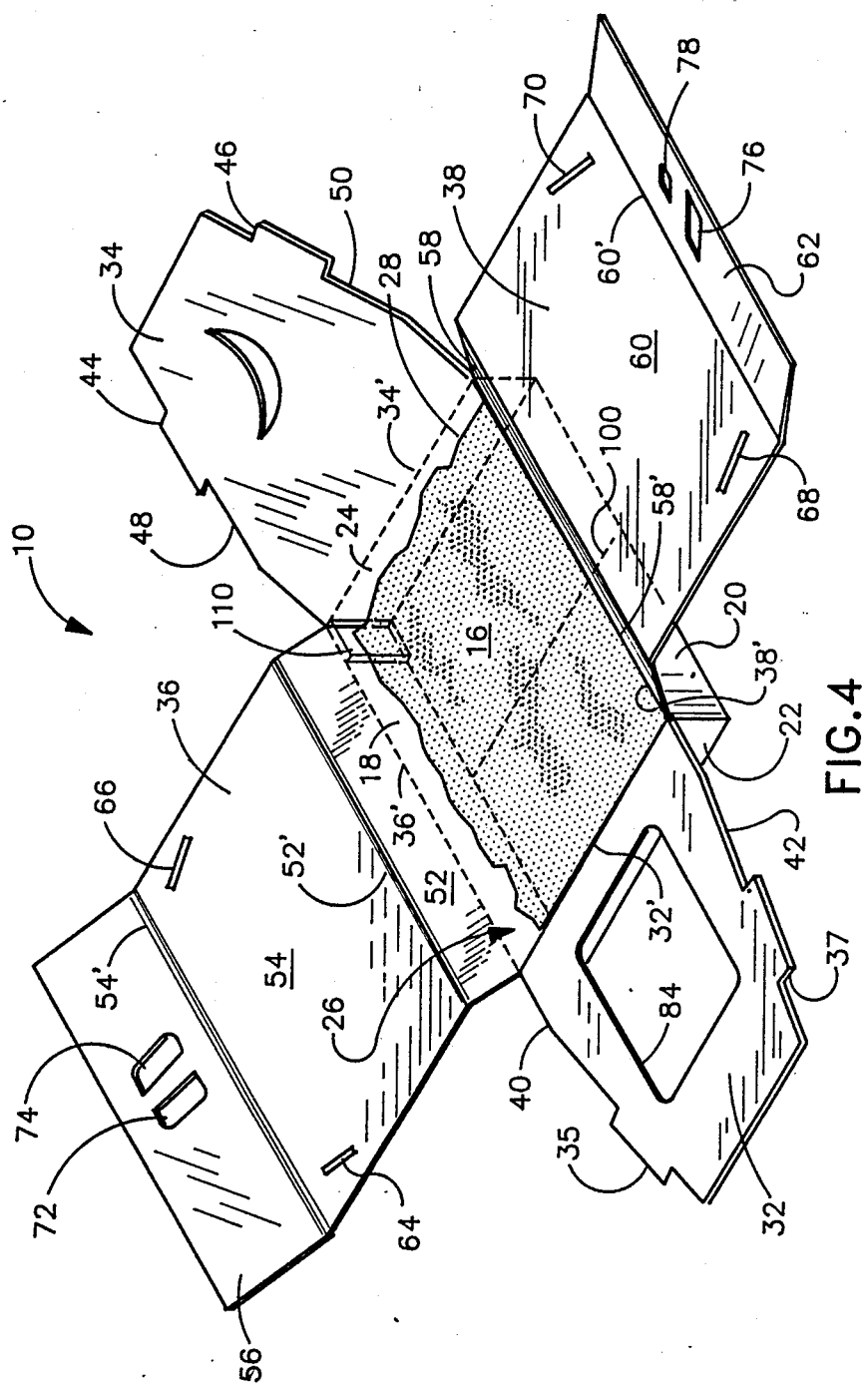
FIG. 4 is a perspective view of the litter box of the invention in an intermediate stage between its collapsed state and its erect state.

Referring in particular to FIGS. 3 and 4, the bottom 16 of the container 10 is constructed from a plurality of flaps. In one preferred form, a first bottom flap 88 is provided as an extension from the bottom edge of the side wall 18 and is defined by crease line 88′ at this juncture. Likewise, a bottom flap 90 is also provided from the bottom of the wall member 20 and is defined by a crease line 90′. In preferred form, the flaps 88 and 90 extend the entire width of the container 10 between peripheral walls 18, 20 so as to provide a double thick bottom surface. Interior bottom flaps 92 and 94 are likewise extensions, respectively, from the bottom of the front peripheral wall 22, defined by the fold line 92′, and the bottom of the rear peripheral wall 24, as defined by the crease line 94′. The inner bottom flaps 92, 94 are folded interiorly of the flaps 88, 90 and are preferably half the length of the container 10. In this manner, the end surfaces 96, 98 of the flaps 92, 94 abut each other along the juncture 100 as illustrated in FIG. 4. In this manner, there is no central crack or opening through the bottom of the container 10 due to the complete overlapping of the flaps 88, 90. This arrangement of the invention assists in preventing leakage from the container 10. Moreover, the multiple overlapping arrangement of the bottom 16 provides a triple thick bottom to prevent soakage through the bottom of the container 10 onto the surface below.

Turning not to FIG. 3, the container 10 of the present invention is preferably constructed from a single blank of material. In preferred form, the material is single wall corrugated cardboard of approximately one-eighth inck thick, although any appropriate material of construction may be utilized. Such a cardboard construction arrangement provides sufficient strength so that approximately 10 pounds of clay litter may be readily placed within the receptacle 26.

In preferred from, the single blank construction member is made from four panel sections, 102, 104, 106 and 108. Panel section 102 corresponds to the side panel 54, peripheral side wall 18 and the bottom flap 88, while the panel section 104 corresponds to the front panel 32, the front peripheral wall 22 and the interior bottom flap 92. The panel section 106 corresponds to the side panel 60, peripheral side wall 20 and the bottom flap 90, while the panel section 108 corresponds to the rear panel 34, the rear peripheral wall 24 and the interior bottom flap 94. The only connection between the panels 102-108 is along the peripheral side walls 18-24, which peripheral side walls 18-24 are a unitary piece of material as illustrated in FIG. 3. Thus, crease folds 18′, 22′, and 20′ are provided, respectively, between the side edges of the peripheral side wall members 18, 22, 20 and 24. Finally, an end tab 110 is provided at the outermost edge of the peripheral side wall 24, the tab 110 being divided from the wall 24 by a crease fold 24′.

Once the blank material for the container 10 is stamped out as illustrated in FIG. 3, the panels 102-108 are folded along the fold creases 18′, 22′, 20′ and 24′. The tab 110 is then glued to the interior of the peripheral side wall 18 as clearly illsutrated in FIG. 4. Glue and/or tape may be utilized to connect the bottom flap members 88, 90, 92 and 94. To fold the container 10 to its collapsed position as illustrated in FIG. 2, the front and rear panels 32, 34 are folded inwardly along their crease lines, 32′, 34′ within the receptacle 26. The top flaps 56 and 62 of the side panels 36, 38 are then folded along their respective crease lines 54′, 60′, and laid down along the inner surface of the side portions 54, 60, respectively. The side panels 36, 38 are then folded inwardly along their crease lines 36′, 38′ into the receptacle 26. Thus, the side panels 36, 38 function as the top member 30 for the container 10 in its collapsed condition. A piece of tape or other adhesive member may then be used to temporarily keep the top 30 in position until it is desired to erect the container 10 to its erect, used position as illustrated in FIG. 1. When this is desired, the panels 32, 34, 36 and 38 are unfolded, the ears 35, 37, 44, 46 are then inserted into their respective slots 64-70, the top flaps 56 and 62 are overlayed, and the tabs 80, 82 are then folded down through the apertures 72-78 to secure the flaps 56 and 62 together. At this point, the container 10 is then in its fully erect position and is ready for use, since the litter 28 is already contained within the container 10.

As can be seen from the above, the present invention provides a disposable, totally enclosed pet container which has the option of having litter already included therein. The present invention prevents spillage of litter outside the container during use by pets, yet provides for easy disposal merely by collapsing the box to its fully collapsed position. Moreover, this fully collapsed position prior to use permits easy storage of the box with very little space consumption. Finally, the container of the present invention is easily manufactured since it is made from a single piece of material and may be secured together merely by following the fold creases and gluing a couple of key critical points. Thus, very little labor or material is required to manufacture and assemble the container of the present invention. Consequently, the present invention is convenient to store, easy to erect and use, and economic to manufacture. The box of the invention can also be used as a portable pet house without the litter.

The foregoing description and the illustrative embodiments of the present invention have been shown in the drawings and described in detail in varying modifications and alternate embodiments. It should be understood, however, that the foregoing description of the invention is exemplary only, and that the scope of the invention is limited only to the claims as interpreted in view of the prior art.

The embodiments of the invention in which an exclusive property or privilege is claimed are defined as follows:

1. An integral, disposable pet litter container foldable between a collapsed state for storage and disposal and an enclosed, erect state for use, said container comprising:
    a lower box portion defining a litter-containing receptacle, said lower box portion including bottom means having a plurality of overlapping bottom flap members to provide structural strength to contain litter in both said collapsed and erect states as well as to inhibit seepage therethrough, first and second pairs of oppositely disposed peripheral wall members extending upwardly from said bottom means to form said litter-containing receptacle therewith, and foldable top means having overlapping portions in said collapsed state for covering said lower box portion in said collapsed state for covering said lower box portion and providing structural strength and integrity in said collapsed state;

an upper box portion selectively extendable from said lower box portion, said upper box portion including front and rear panels extending upwardly from said first pair of oppositely disposed peripheral wall members of said lower box portion and adapted for selective folding into said lower box portion of storage when in said collapsed state, and a pair of side panels projecting upwardly from said second pair of oppositely disposed peripheral wall members of said lower box portion to overlap each other and form said foldable top means when in said collapsed state; and said side panels including means for interlocking with said front and rear panels to selectively maintain said container in said erect state and further including top flap members for overlapping engagement aligned substantially parallel to said bottom means when in said erect state, and including means for interconnecting the same, to form a top, substantially horizontal surface for said container to totally enclose said container and to provide a substantial width dimension at the top of said erect container for ample pet head room therewithin, said front panel having means for pet entry into and from the interior of said enclosed, erect container.

2. The container as claimed in claim 1, wherein said container includes means for ventilating the interior thereof when in said erect state.

3. The container as claimed in claim 2, wherein said ventilation means comprises at least one large aperture disposed in said rear panel.

4. The container as claimed in claim 1, wherein said top flap interlocking means comprises a pair of aligned apertures disposed in said top flap members and at least one tab connected to one of said top flap members and adapted to pass through said aligned apertures for engagement with the second top flap member.

5. The container as claimed in claim 1, wherein each said side panel comprises an extension of a peripheral wall member and includes a first fold line along the juncture of said panel and said wall member, a second fold line spaced upwardly from said first fold line and substantially parallel thereto, and a third fold line spaced upwardly from said second fold line substantially parallel thereto, said third fold line forming the juncture between said side panel and said top flap member to permit said top flap member to be folded substantially parallel to said bottom flap members when said container is in its erect state and to be folded under said side panel for storage in said lower box portion when said container is in its collapsed state.

6. The container as claimed in claim 1, wherein each said front and rear panel comprises an extension of a peripheral wall member, with each said front and rear panel having one fold line disposed along the juncture between said front and rear panel and its adjacent peripheral wall member.

7. The container is claimed in claim 1, wherein said interlocking means are adapted to align said front, rear and side panels in a preestablished erect position and maintain said panels in said position once the container is in said erect state.

8. The container as claimed in claim 7, wherein said interlocking means further includes means disposed on said front and rear panels for interengagement with said means disposed on said side panels.

9. The container as claimed in claim 8, wherein said interlocking means comprises a pair of slots disposed toward the upper rear and upper front side edges of each said side panel, and a pair of ears projecting outwardly from each of said front and rear panels, said ears being adapted for interengagement with a corresponding slot in an adjacent side panel to firmly interlock said front and rear panels wsith said side panels.

10. The container as claimed in claim 1, wherein said bottom means further comprises a pair of oppositely disposed bottom flap members each extending the entire width of said container from the bottom side edge of said second pair of oppositely disposed peripheral wall members, said bottom flap members overlapping each other to provide a double thickness for said bottom means, and a pair of inner bottom flaps extending from the bottom side edges of said first pair of oppositely disposed peripheral wall members, said inner bottom flaps extending half the length of said container to abut each other at the midpoint of said container when folded inwardly above said folded bottom flap members, said inner bottom flaps providing a third layer of thickness to said bottom means.

11. The container as claimed in claim 1, wherein said container includes dry litter disposed within said receptacle when said container is in a collapsed storage state.

12. The container as claimed in claim 1, wherein said litter-containing receptacle is lined with a moisture-repellent material to reduce liquid seepage therethrough.

13. The container as claimed in claim 1, wherein said container is constructed from a unitary blank of constructed material.

14. The container as claimed in claim 13, wherein said container is constructed from a durable, reinforced cardboard material.

15. A disposable pet container constructed from a unitary blank of construction material and foldable between a first compact and collapsed storage and disposal position, and a second erect and totally enclosed use position, said container comprising;

bottom means having a plurality of overlapping bottom flap members for providing structural strength as well as for inhibiting liquid seepage;

front and rear members extending upwardly from said bottom means, said front member including means for pet access to the interior of said container;

side members extending upwardly from said bottom means and selectively interlocking with said front and rear members to maintain said container in said erect position;

top means extending from said side members including a pair of top flap members each extending from one said side member for overlapping engagement substantially parallel to said bottom means when in said use position and having means for interlocking the same to form a top surface having a substantial width dimension for said container for totally enclosing said container and providing ample pet head room therewithin; and said front, rear and side members all including a substantially horizontal crease line positioned uniformly from said bottom means around the periphery of said container to define a bottom receptacle area as well as to provide crease lines for the folding and collapse of said container to said storage and disposal position, said side members and top means overlapping each other when in said storage and disposal position to provide structural strength and integrity.

16. The container as claimed in claim 15, wherein said front and rear members are sized and shaped to permit said front and rear members to be folded inwardly along the crease lines thereof into the interior of said container when folding said container to said collapsed, storage position, and wherein said top flap members are defined by crease lines along said side members, said top flap members being foldable along the inside surface of said side members to permit said side members to overlap and form a top surface for said container when said container is said collapsed position.

17. The container as claimed in claim 15, wherein said rear member includes ventilation means disposed therein.

18. The container as claimed in claim 15, wherein said litter is disposed within said receptacle area when said container is in its collapsed, stored position prior to use.

19. The container as claimed in claim 15, wherein said single blank of material comprises reinforced cardboard.

20. The container as claimed in claim 15, wherein said bottom means comprises a pair of overlapping flaps, each extending the entire width of said container to provide at least double thickness at said bottom means.

21. A single blank of carton-forming material foldable into a disposable pet box having a collapsed state for storage and disposal and an erect state for pet use, said single blank of carton-forming material comprising four aligned panels interconnected with each other with alternate panels being substantially similar in size and shape, said first and third panels each being rectangular in shape and segmented by substantially parallel fold lines into a bottom flap, an edge portion, a side member with a pair slots therein, and a top flap, each said side member having an additional fold line space approximately one-third the distance of said side member from said edge portion, and said second and fourth panels each having folds lines aligned with the fold lines of said first and third panels to define a bottom flap, an edge portion similar in height with the edge portions of said first and third panels, and an end member generally in the shape of a modified "A" and a truncated cone with ears projecting from the side edges thereof, said fourth panel having an additional tab member generally extending beyond the end of the edge portion thereof, said four panels being interconnected only at the juncture of the corresponding edge portions of each said panel.

* * * * *